(12) United States Patent
Sonoda et al.

(10) Patent No.: US 10,481,566 B2
(45) Date of Patent: Nov. 19, 2019

(54) MACHINE LEARNING DEVICE, SERVO CONTROL DEVICE, SERVO CONTROL SYSTEM AND MACHINE LEARNING METHOD

(71) Applicant: FANUC CORPORATION, Yamanashi (JP)

(72) Inventors: Naoto Sonoda, Yamanashi (JP); Satoshi Ikai, Yamanashi (JP); Ryoutarou Tsuneki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 42 days.

(21) Appl. No.: 15/926,057

(22) Filed: Mar. 20, 2018

(65) Prior Publication Data

US 2018/0284702 A1 Oct. 4, 2018

(30) Foreign Application Priority Data

Mar. 31, 2017 (JP) .................................. 2017-071017

(51) Int. Cl.
*G05B 13/02* (2006.01)

(52) U.S. Cl.
CPC .................................. *G05B 13/027* (2013.01)

(58) Field of Classification Search
CPC .......................... G05B 13/027; G05B 13/029
See application file for complete search history.

(56) References Cited

U.S. PATENT DOCUMENTS

| 5,852,817 | A * | 12/1998 | Kano | G05B 13/027 |
| | | | | 706/23 |
| 6,000,827 | A * | 12/1999 | Hosogi | G05B 17/02 |
| | | | | 700/44 |
| 9,360,849 | B2 * | 6/2016 | Kawana | G05B 19/416 |
| 10,261,490 | B2 * | 4/2019 | Shinoda | G05B 19/19 |
| 2005/0211198 | A1 | 9/2005 | Froeschle et al. | |
| 2018/0284703 | A1* | 10/2018 | Sonoda | G05B 13/0265 |

FOREIGN PATENT DOCUMENTS

| CN | 1674429 | 9/2005 |
| CN | 101261509 | 9/2008 |
| CN | 103532459 | 1/2014 |
| CN | 104038128 | 9/2014 |
| CN | 104270046 | 1/2015 |

(Continued)

OTHER PUBLICATIONS

Office Action dated Jun. 21, 2019 in Chinese Patent Application No. 201810264707.1.

*Primary Examiner* — Chun Cao
(74) *Attorney, Agent, or Firm* — Wenderoth, Lind & Ponack, L.L.P.

(57) ABSTRACT

A machine learning device includes a label acquisition unit for acquiring, as a label, a current command that drives a control target of a servo control device in a state in which disturbance is suppressed; an input data acquisition unit for acquiring, as input data, a velocity of the control target driven based on the current command in the state in which disturbance is suppressed; and a learning unit for constructing a learning model for estimating a current to drive the control target from the velocity of the control target, by way of performing supervised leaning with a group of the label and the input data as training data.

6 Claims, 11 Drawing Sheets

(56) References Cited

FOREIGN PATENT DOCUMENTS

| | | |
|---|---|---|
| CN | 104977895 | 10/2015 |
| CN | 106054816 | 10/2016 |
| JP | 4-84303 | 3/1992 |
| JP | 6-149308 | 5/1994 |
| JP | 7-210207 | 8/1995 |
| JP | 2001-28809 | 1/2001 |
| JP | 2004-199289 | 7/2004 |
| JP | 2008-217259 | 9/2008 |

* cited by examiner

MACHINE LEARNING DEVICE, SERVO CONTROL DEVICE, SERVO CONTROL SYSTEM AND MACHINE LEARNING METHOD

This application is based on and claims the benefit of priority from Japanese Patent Application No. 2017-071017, filed on 31 Mar. 2017, the content of which is incorporated herein by reference.

BACKGROUND OF THE INVENTION

Field of the Invention

The present invention relates to a machine learning device, servo control device, servo control system and machine learning method for suppressing disturbance.

Related Art

As a servo control device of machine tools and industrial machines, Patent Document 1 discloses a configuration capable of high-precision positioning that can handle non-linearity, disturbance or environmental changes with time of a control target. More specifically, as a servo control device having a controller that performs feedback control of control error between the target value and control output so as to make the control output of the control target match the target value, Patent Document 1 discloses a servo control device including a neural network model establishing the outputs of the controller as input signals, a linear model establishing the outputs of the controller as input signals, and a learning means that establishes the output of the neural network as the input signal of the control target, and varies the weighting between each layer of the neural network so that the output of the control target and the output of the linear model come to be equal.

Patent Document 1: Japanese Unexamined Patent Application, Publication No. H07-210207

SUMMARY OF THE INVENTION

The aforementioned configuration disclosed in Patent Document 1 establishes a linear model as a reference model, and performs reference-type adaptive control so as to match the characteristics of this linear model; therefore, it is necessary for the user to prepare linear models individually. However, the matter of the user preparing linear models individually is complex for the user, and thus a servo control device that suppresses disturbance, etc. more easily has been desired.

The present invention has an object of providing a machine learning device, servo control device, servo control system and machine learning method that simply suppress disturbance, while avoiding complex adjustments.

A machine learning device (for example, the machine learning device 200, 200-1~200-n, 201, 202 described later) according to a first aspect of the present invention includes: a label acquisition unit (for example, the label acquisition unit 200 described later) configured to acquire, as a label, a current command that drives a control target (for example, the control target 400 described later) of a servo control device in a state in which disturbance is suppressed; an input data acquisition unit (for example, the input data acquisition unit 210 described later) configured to acquire, as input data, a velocity of the control target driven based on the current command in the state in which disturbance is suppressed; and a learning unit (for example, the learning unit 230 described later) configured to construct a learning model for estimating a current to drive the control target from the velocity of the control target, by way of performing supervised leaning with a group of the label and the input data as training data.

According to a second aspect of the present invention, in the machine learning device as described in the first aspect, the control target may include a motor (for example, the servomotor 401 described later) and a load (for example, the load 402 described later) configured to move by way of the motor, wherein the velocity acquired by the input data acquisition unit is a rotation velocity of the motor and a velocity of the load.

According to a third aspect of the present invention, the machine learning device as described in the first or second aspect may further include a function output unit (for example, the estimated current generation function output unit 250 described later) configured to generate a function for estimating a current to drive the control target from the velocity of the control target, based on the learning model constructed by the learning unit, and configured to output to the servo control device.

According to a fourth aspect of the present invention, in the machine learning device as described in any one of the first to third aspects, the servo control device may include a current control unit (for example, the current control unit 180 described later) that constitutes a current feedback loop, and an amplifier (for example, the amplifier 190 described later), in which the current command to drive the control target is applied to the control target via the current control unit and the amplifier, and
the current command inputted to the label acquisition unit may be output of the amplifier.

A servo control system according to a fifth aspect of the present invention includes: the machine learning device (for example the machine learning device 200, 200-1~200-n, 201, 202 described later) as described in the third aspect, and the servo control device (for example, the servo control device 100, 100-1~100-n, 101, 102 described later) configured to output the current command and the velocity of the control target to the machine learning device,
in which the servo control device includes an estimated current generation unit (for example, the estimated current generation unit 150 described later) configured to estimate a current to drive the control target from the velocity of the control target, based on the function outputted from the function output unit; a subtraction unit (for example, the subtracter 140 described later) configured to obtain a difference between the current command and an estimated current that was estimated by the estimated current generation unit; and a disturbance compensating unit (e.g., the disturbance compensator 160 described later) configured to generate a compensated current for compensating disturbance based on the difference.

According to a sixth aspect of the present invention, in the servo control system as described in the fifth aspect, the servo control device may include a current control unit (for example, the current control unit 180 described later) that constitutes a current feedback loop, and an amplifier (for example, the amplifier 190 described later), in which the current command to drive the control target is applied to the control target via the current control unit and the amplifier, and the current command inputted to the label acquisition unit may be output of the amplifier.

A servo control device according to a seventh aspect of the present invention includes: the machine learning device (for example the machine learning device 200, 200-1~200-n, 201, 202 described later) as described in the third aspect, an estimated current generation unit (for example, the estimated current generation unit 150 described later) configured to estimate the current to drive the control target from the velocity of the control target, based on the function outputted from the function output unit;
a subtraction unit (for example, the subtracter 140 described later) configured to obtain a difference between the current command and the estimated current that was estimated by the estimated current generation unit; and
a disturbance compensating unit (for example, the disturbance compensator 160 described later) configured to generate a compensated current for compensating disturbance based on the difference.

According to an eighth aspect of the present invention, in the servo control device as described in the seventh aspect may further include: a current control unit (for example, the current control unit 180 described later) that constitutes a current feedback loop, and an amplifier (for example, the amplifier 190 described later), in which the current command to drive the control target is applied to the control target via the current control unit and the amplifier, and the current command inputted to the label acquisition unit may be output of the amplifier.

A machine learning method for a machine learning device according to a ninth aspect of the present invention includes the steps of: acquiring, as a label, a current command to drive a control target of a servo control device in a state in which disturbance is suppressed;
acquiring, as input data, a velocity of the control target driven based on the current command in the state in which disturbance is suppressed;
constructing a learning model for estimating the current to drive the control target from the velocity of the control target, by way of performing supervised learning with a group of the label and the input data as training data.

According to the present invention, it is possible to suppress disturbance simply, while avoiding complex adjustments.

DETAILED DESCRIPTION OF THE INVENTION

Hereinafter, embodiments of the present invention will be explained in detail using the drawings. It should be noted that, although explanations will be made for three embodiments hereinafter, the overall configuration serving as the premise thereof is shared between the respective embodiments; therefore, an explanation will be made first for the shared overall configuration in these respective embodiments.

<Shared Overall Configuration of Respective Embodiments>

Figure 1:
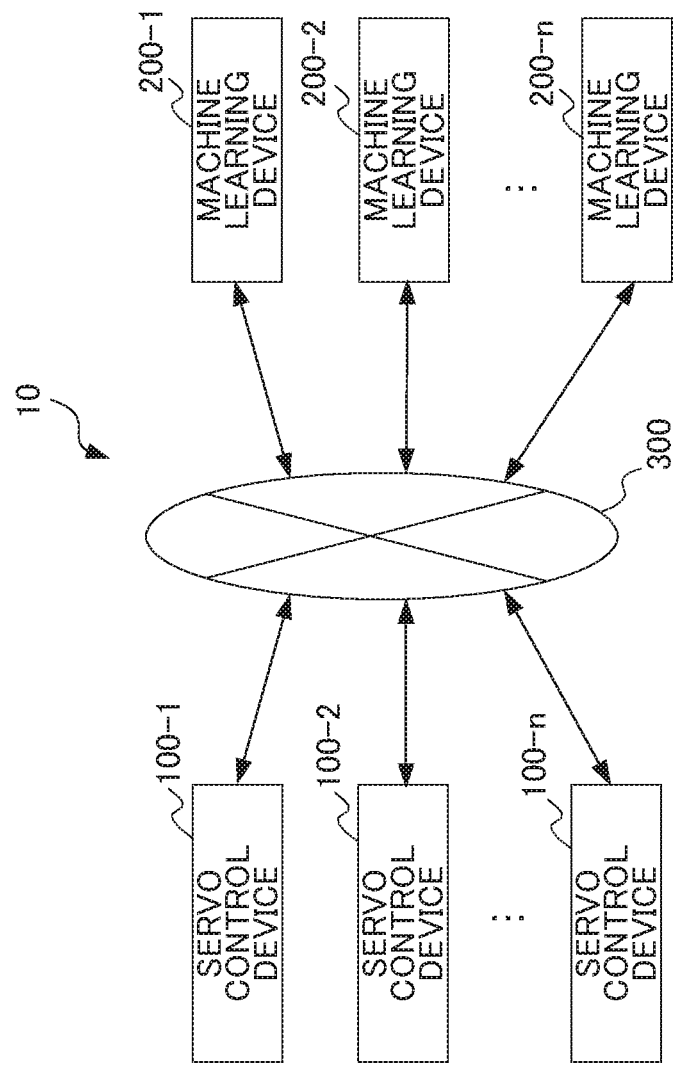
FIG. 1 is a block diagram showing a servo control system according to a first embodiment of the present invention.

FIG. 1 is a block diagram showing a servo control system according to a first embodiment of the present invention. The servo control system 10 includes n-number of servo control devices 100-1~100-n, n-number of machine learning devices 200-1~200-n, and a network 300, as shown in FIG. 1. It should be noted that n is any natural number.

Herein, the servo control device 100-1 and the machine learning device 200-1 are made into a 1-to-1 group, and are connected to be communicable. The servo control devices 100-2~100-n and machine learning devices 200-2~200-n are connected, similarly to the servo control device 100-1 and the machine learning device 200-1. In FIG. 1, n-number of groups of the servo control devices 100-1~100-n and machine learning devices 200-1~200-n are connected via the network 300; however, for n-number of groups of he servo control devices 100-1~100-n and machine learning devices 200-1~200-n, the servo control device and machine learning device of each group may be directly connected via a connection interface. The n-number of groups of the servo control devices 100-1~100-n and machine learning devices 200-1~200-n may be installed in the same factory, or may be installed in respectively different factories, for example.

The network 300, for example, is a LAN (Local Area Network) constructed within the factory, the Internet, public telephone network, or a combination of these. The specific communication system of the network 300, whether being a wired connection or wireless connection, etc. is not particularly limited.

First Embodiment

Figure 2:
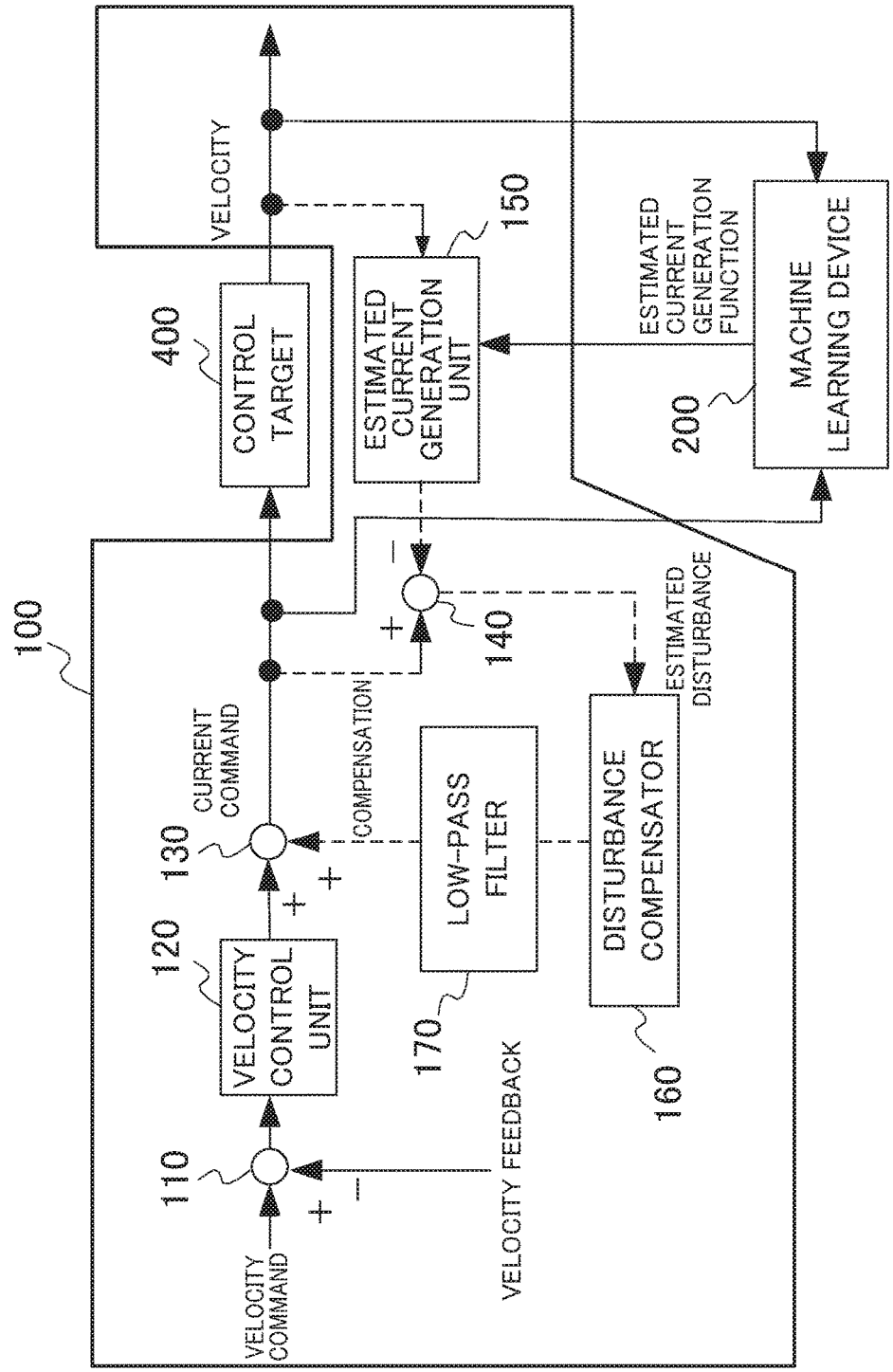
FIG. 2 is a block diagram showing the configuration of a servo control device of the servo control system according to the first embodiment of the present invention.

FIG. 2 is a block diagram showing one configuration example of a group of a servo control device and machine learning device in the servo control system according to the first embodiment of the present invention. The servo control device 100 and machine learning device 200 shown in FIG. 2, for example, correspond to the servo control device 100-1 and machine learning device 200-1 shown in FIG. 1. In FIG. 2, the network 300 existing between devices is omitted from this illustration.

As shown in FIG. 2, the servo control device 100 includes subtracter 110, velocity control unit 120, adder 130, subtracter 140, estimated current generation unit 150, disturbance compensator 160, and low-pass filter 170. The machine learning device 200 receives a current command value from the adder 130 and a velocity detection value from the control target 400. The machine learning device 200 performs supervised learning, which is machine learning based on training data setting the current command value as a label, and setting the velocity command value as input data, and outputs an estimated current generation function to the estimated current generation unit 150.

The control target 400 that is servo controlled by the servo control device 100, for example, is a servomotor, or a machine tool, robot, industrial machine or the like including a servomotor. The servo control device 100 may be provided as a part of a machine tool, robot, industrial tool or the like. In the following explanation, a case of the control target 400 being a machine tool including a servomotor will be explained.

In the present embodiment, the servo control device 100 drives the control target 400 in a state in which disturbance does not occur during machine learning, i.e. state not machining a workpiece, and thus control to compensate for disturbance is not performed. For this reason, the circuit from the adder 130 returning to the adder 130 via the subtracter 140, estimated current generation unit 150, disturbance compensator 160 and low-pass filter 170 does not function during machine learning. With the meaning of a circuit not functioning, this circuit is expressed by a dotted line in FIG. 2. For example, to make this circuit so as not to function, it is sufficient for the servo control device 100 to control so that the output signal from the disturbance compensator 160 is not outputted.

The servo control system 10, during machine learning, can drive the control target 400 using a machining program for a workpiece to be actually machined by the machine tool to perform machine learning. However, since the processing time is generally long depending on the machining program, it is desirable for the servo control system 10 to use an evaluation program for machine learning separately from the actual machining program. The evaluation program designates the movement distance in the axial direction, feed rate, etc. according to the machining shape during machine learning. The machining shape during machine learning, for example, is a circle, square, and a square with quarter arc. According to such machining shapes, it is possible to cause reversing of the rotational direction of the servomotor, and to make stop from a rotating state.

Next, an explanation will be made for the flow of signals during machine learning in the present embodiment by referencing FIG. 2. First, the velocity command for controlling driving of the control target 400 is inputted from a higher-order device, which is omitted from illustration, to the servo control device 100. The subtracter 110 obtains a velocity deviation, which is the difference between the velocity command inputted to the servo control device 100 and the velocity detection value of velocity feedback from the control target 400, and outputs to the velocity control unit 120.

The velocity control unit 120 adds a value arrived at by multiplying and integrating the integral gain K1v by the velocity deviation, and a value arrived at by multiplying a proportional gain K2v by the velocity deviation, and outputs this added value to the control target 400 and the machine learning device 200 via the adder 130 as a current command value. The adder 130 obtains the difference between the current command value and the output of the low-pass filter 170 during actual machining, and outputs this difference to the control target 400. On the other hand, the adder 130 outputs the current command value during machine learning as is to the control target 400 and the machine learning device 200.

The servomotor included in the control target 400 is driven based on the current command value. The rotation angle position of the servomotor in the control target 400 is detected by a rotary encoder serving as a position detection unit associated with the servomotor, and the detected signal is used as the velocity detection value of velocity feedback. In addition, the velocity detection value is inputted to the machine learning device 200.

The machine learning device 200 performs supervised learning, which is machine learning using the velocity detection value outputted from the rotary encoder as training data, and the current command value as a label. The machine learning device 200 constructs a learning model by way of performing supervised learning, and outputs to the estimated current generation unit 150 with an inverse function Js of a transfer function 1/Js of the control target 400 as an estimated current generation function. Details of supervised learning in the machine learning device 200 are described later.

Figure 3:
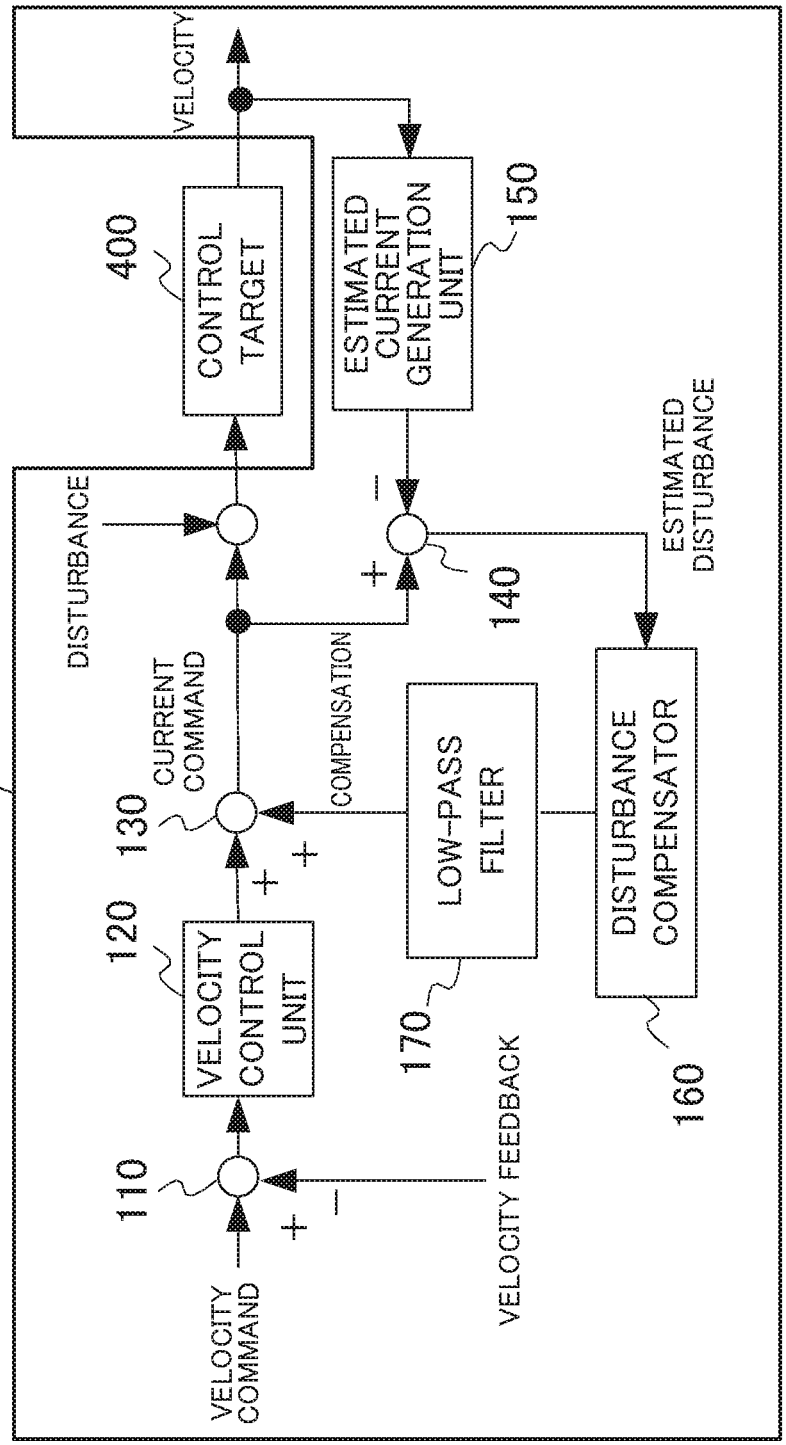
FIG. 3 is a block diagram showing the configuration of the servo control device during machining in the servo control system according to the first embodiment of the present invention.

When the machine learning device 200 sets the inverse function Js in the estimated current generation unit 150, as shown in FIG. 3, the servo control device 100 can generate a compensation current so as to compensate the velocity variation occurring due to disturbance by way of the next operation, even if disturbance occurs when performing machining of the workpiece according to the actual machining program after learning. FIG. 3 is a block diagram showing the configuration of the servo control device during machining of the servo control system according to the first embodiment of the present invention. During actual machining, machine learning is not performed, and for this reason, a connection with the machine learning device 200 is not illustrated in FIG. 3.

As shown in FIG. 3, the velocity command value is inputted to the subtracter 110 based on the actual machining program after learning. The subtracter 110 obtains the velocity deviation which is the difference between the inputted velocity command and the velocity detection value of velocity feedback from the control target 400, and outputs to the velocity control unit 120. The velocity control unit 120 adds a value arrived at by multiplying and integrating the integral gain K1v by the velocity deviation, and a value arrived at by multiplying the proportional gain K2v by the velocity deviation, and outputs this addition value to the adder 13 as a current command value. The adder 130 obtains the difference between the current command value and the output of the low-pass filter, and outputs this difference to the control target 400 and subtracter 140.

In the case of disturbance occurring due to machining of the workpiece and the velocity of the servomotor serving as the control target changing, the velocity detection value including the velocity variation component due to disturbance is inputted to the estimated current generation unit 150. Since the transfer function is set to an inverse function of the control target 400, when the velocity detection value including the velocity variation component due to disturbance is inputted, the estimated current generation unit 150 outputs the estimated current value including a current component added due to the influence of disturbance to the subtracter 140.

The subtracter 140 takes the difference between the current command value and the estimated current value including the current component due to disturbance, and inputs only the current component due to disturbance to the disturbance compensator 160. The disturbance compensator 160 generates a compensation current value, and inputs the compensation current value to the adder 130 via the low-pass filter 170. The adder 130 adds the compensation current value due to disturbance to the current command value, and then outputs. In this way, the current command value is compensated so as to suppress velocity variation in the servomotor of the control target 400 due to disturbance, and the servomotor is driven based on the current command thus compensated. The low-pass filter 170 is provided in order to remove the frequency components shorter than the time from the disturbance being added until suppressing the influence due to disturbance by the compensation current value.

Figure 4:
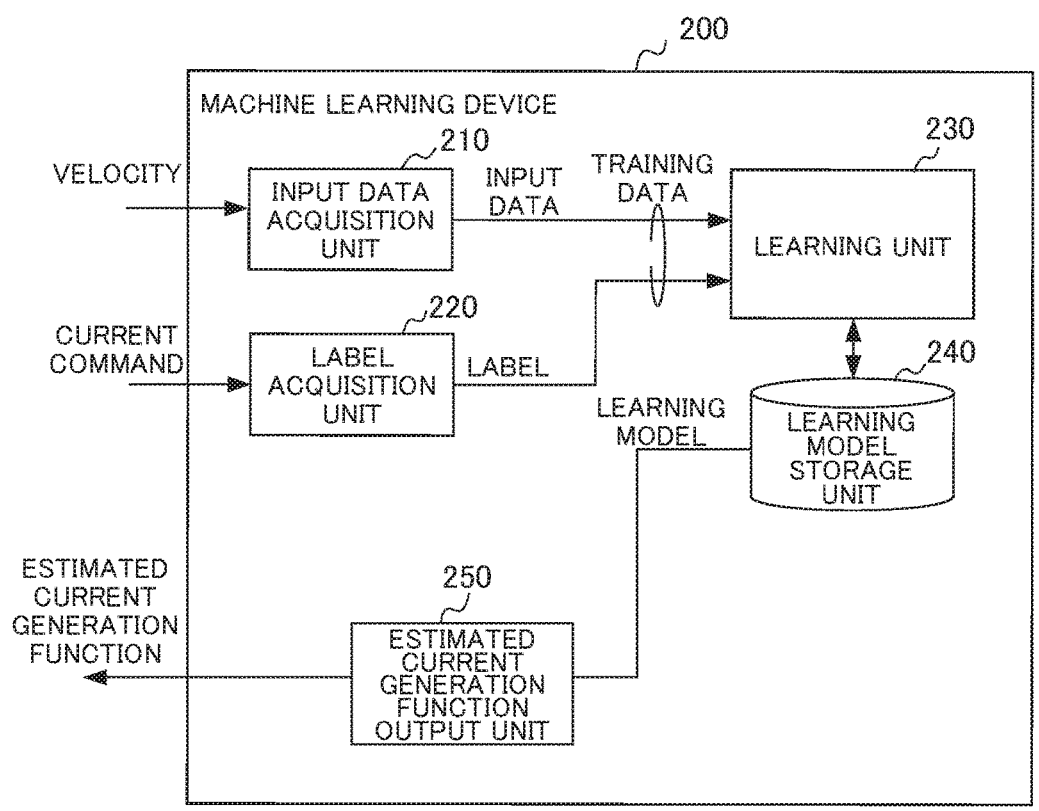
FIG. 4 is a block diagram showing the configuration of a machine learning device of the servo control system according to the first embodiment of the present invention.

Next, the configuration and operations of the machine learning device 200 will be explained using FIG. 4. FIG. 4 is a block diagram showing the configuration of a machine learning device of a servo control system according to the first embodiment of the present invention. As shown in FIG. 4, the machine learning device 200 includes an input data acquisition unit 210, label acquisition unit 220, learning unit 230, learning model storage unit 240, and estimated current generation function output unit 250.

The input data acquisition unit 210 acquires the velocity detection value of the servomotor driven based on the velocity command as input data (also called feature value), and outputs the acquired input data to the learning unit 230. The label acquisition unit 220 acquires the current command outputted from the adder 130 as a label, and outputs the acquired label to the learning unit 230.

In this way, a group of the velocity detection value which is input data, and the current command which is a label, is inputted to the learning unit 230. This group of input data and label corresponds to the training data for machine learning.

The learning unit 230 constructs a learning model, by performing machine learning called supervised learning, based on the training data that was inputted in this way. Herein, since supervised learning in itself is well known to those skilled in the art, a detailed explanation will be omitted, and an overview thereof will be explained.

Supervised learning, for example, is performed by a neural network configured by combining perceptrons. More specifically, the group of input data and labels included in training data is provided to the neural network, and learning is repeated while changing the weighting of the respective perceptrons so that the output of the neural network becomes the same as the label. For example, after forward propagation is performed, processing of back-propagation (also called error back propagation method) is repeated, whereby the weighting values are adjusted so as to decrease the deviation in the output of each perceptron. In this way, the learning unit 230 learns the characteristics of training data, and recursively attains a learning model for estimating a result from inputs.

Herein, supervised learning configures so that the deviation between the label and output data disappears, while causing the values of weighting to differ as mentioned above. Then, the label of the present embodiment is the current command to the control target 400, and the input is the detected velocity value serving as the output of the control target 400. For this reason, the learning model constructed by the learning unit 230 repeating learning corresponds to an inverse function for establishing as equal values the current command to the control target 400 and the output data to the velocity detection value serving as input data.

It should be noted that, although a neural network used by the learning unit 230 in learning may be three layers, it may be four or more layers as well. The learning unit 230 may perform learning according to so-called deep learning (also called deep machine learning). The learning model constructed by the learning unit 230 is outputted to the learning model storage unit 240.

The learning model storage unit 240 is a storage unit which stores learning models constructed and outputted by the learning unit 230 in the learning model storage unit 240. The estimated current generation function output unit 250 acquires the learning model from the learning model storage unit 240, prior to actual machining. Then, the estimated current generation function output unit 250 outputs the estimated current generation function, which is a function calculated based on the acquired learning model, to the estimated current generation unit 150. This estimated current generation function, in a case of disturbance occurring due to the actual machining program, is used in order to generate the estimated current value including the current component due to disturbance in the estimated current generation unit 150.

The functional blocks of the machine learning device 200 has been explained above. In order to realize these functional blocks, the machine learning device 200 includes an arithmetic processing unit such as a CPU (Central Processing Unit). In addition, the machine learning device 200 also includes an auxiliary storage device such as a HDD (Hard Disk Drive) storing various control programs such as application software and the OS (Operating System), and a main storage device such as RAM (Random Access Memory) for storing data that is necessitated temporarily upon the arithmetic processing unit executing programs.

Then, in the machine learning device 200, the arithmetic processing unit reads out the application software and/or OS from the auxiliary storage device, and performs arithmetic processing based on this application software and/or OS, while expanding the read application software and/or OS in the main storage device. In addition, based on these computation results, the arithmetic processing unit controls the various hardware possessed by the respective devices. The functional blocks of the machine learning device 200 in the present embodiment are thereby realized. In other words, the present embodiment can be realized by hardware and software cooperating.

As a specific example, the machine learning device 200 is realized by a part or the like of a personal computer, server device or numerical control device (CNC: Computerized Numerical Control). However, since the computation amount of the machine learning device 200 increases accompanying machine learning, for example, it is desirable to install GPUs (Graphics Processing Units) in the personal computer. The machine learning device 200 is capable of high-velocity processing when configured so as to use GPUs in the computational processing accompanying machine learning, by way of technology called GPGPU (General-Purpose computing on Graphics Processing Units). Furthermore, in order to perform higher velocity processing, the machine learning device 200 may construct a computer cluster using a plurality of computers equipped with such GPUs, and perform parallel computing with the plurality of computers included in this computer cluster. It should be noted that it is possible to realize by configuring the machine learning device 201 of a second embodiment and the machine learning device 202 of a third embodiment described later to be the same as the machine learning device 200 of the present embodiment.

Figure 5:
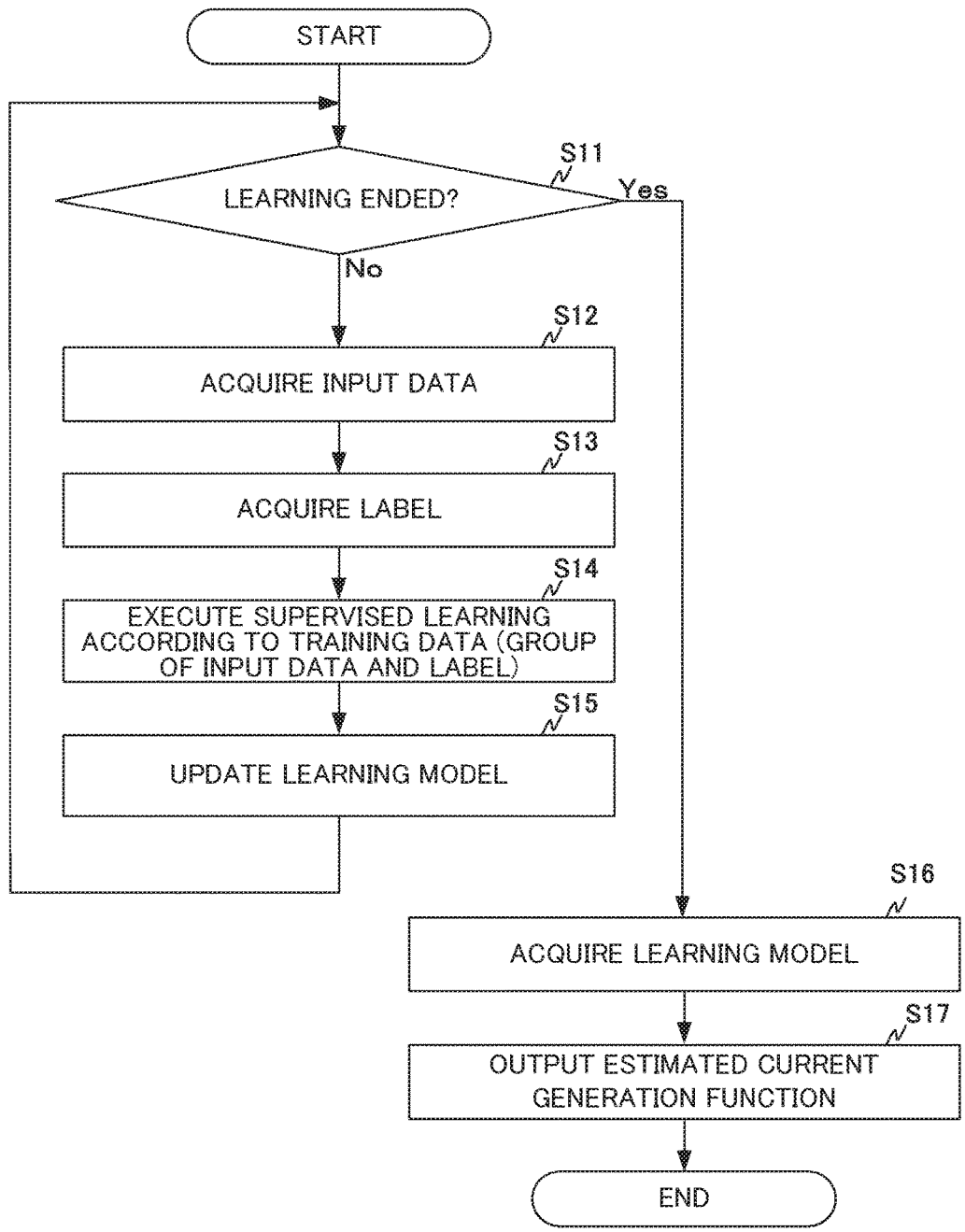
FIG. 5 is a flowchart showing operations of a machine learning device 200 of the present embodiment.

Next, an explanation will be made for the operations related to machine learning of the machine learning device 200 of the present embodiment by referencing the flowchart of FIG. 5. In Step S11, the machine learning device 200 judges whether or not machine learning has ended.

Herein, in the case of machine learning having ended, it is determined as YES in Step S11, and the processing advances to Step S16. In the case of machine learning not having ended, it is determined as NO in Step S11, the processing advances to Step S12. In Step S12 and Step S13, the input data acquisition unit 210 and label acquisition unit 220 of the machine learning device 200 acquire the input data and label. The specific contents of this data are as mentioned above.

In Step S14, the learning unit 230 of the machine learning device 200 executes machine learning using the inputted training data. The specific contents of machine learning using this training data are also as mentioned above.

In Step S15, the learning unit 230 updates the learning model by outputting the constructed learning model to the learning model storage unit 240. Subsequently, the processing advances to Step S11 again.

By repeating the processing from Step S11 to Step S15 in this way, learning is continued. Then, in the case of machine learning having ended, the processing advances to Step S16. It should be noted that the end of machine learning, for example, may be performed according to an instruction from the user, may be performed in the case of the value of deviation between the output of the learning model and label becoming no more than a predetermined value, or may be performed in the case of having repeated machine learning by a predetermined number of times.

In Step S16, the estimated current generation function output unit 250 acquires the learning model stored by the learning model storage unit 240.

In Step S17, the estimated current generation function output unit 250 outputs the estimated current generation function, which is a function calculated based on the acquired learning model, to the estimated current generation unit 150. By operating in this way, the disturbance compensating function of the servo control device 100 becomes effective.

Second Embodiment

Next, an explanation will be made for the configuration of a second embodiment by referencing FIGS. 6, 7 and 8. It should be noted that, for the functions and configurations of the second embodiment, explanations will be omitted for functions and configurations shared with the aforementioned first embodiment. In addition, in FIGS. 6 to 8, the same reference symbols are attached and redundant explanations will be omitted, and an explanation will be made in detail for points differing between the first embodiment and second embodiment.

Figure 6:
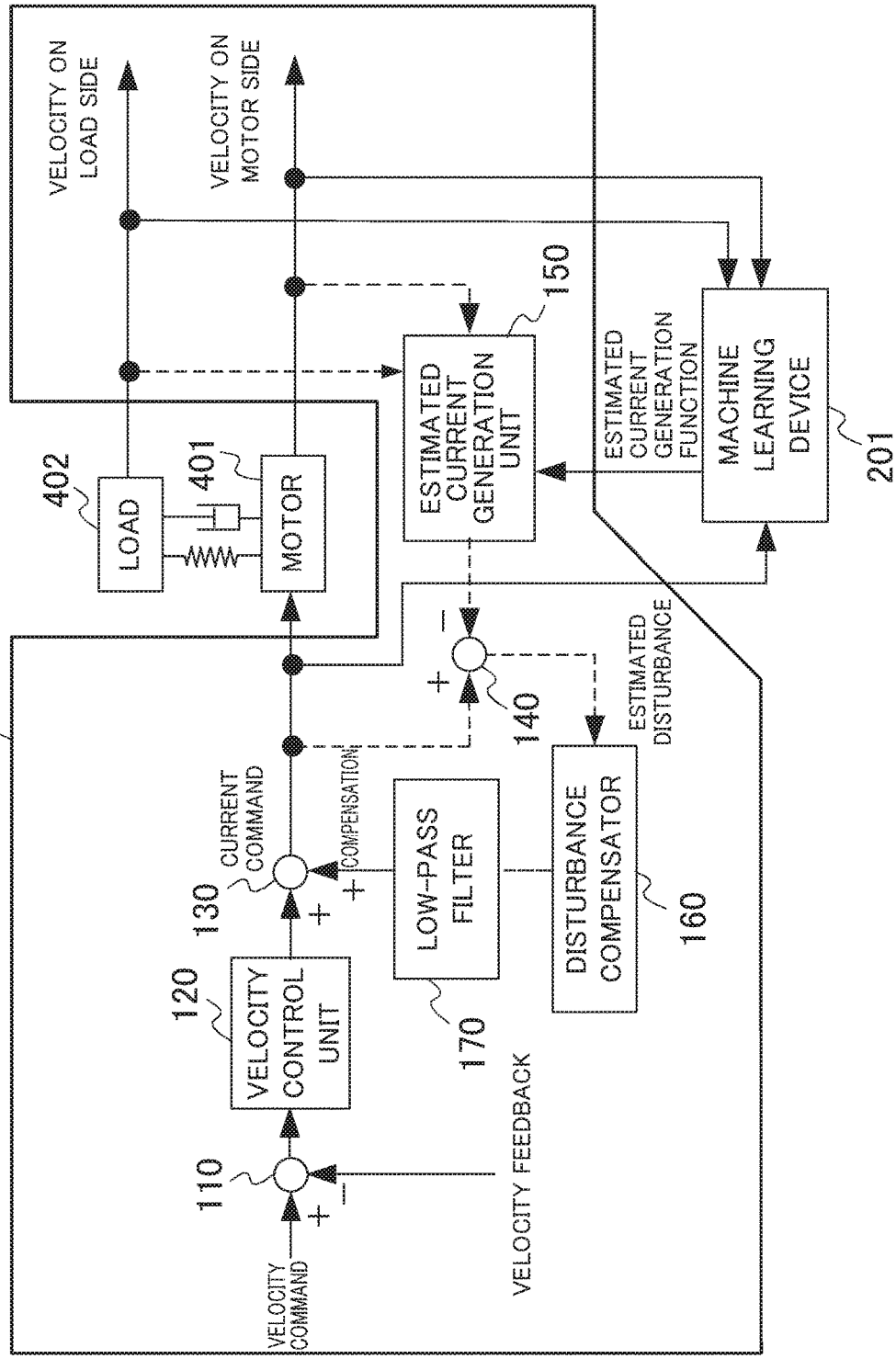
FIG. 6 is a block diagram showing one configuration example of a servo control device and a machine learning device in a servo control system according to a second embodiment of the present invention.

FIG. 6 is a block diagram showing a configuration example of the servo control device and machine learning device in the servo control system according to second embodiment of the present invention. FIG. 7 is a block diagram showing the configuration of a servo control device during machining in a servo control system according to the second embodiment of the present invention. FIG. 8 is a block diagram showing the configuration of a machine learning device of the servo control system according to the second embodiment of the present invention.

Figure 7:
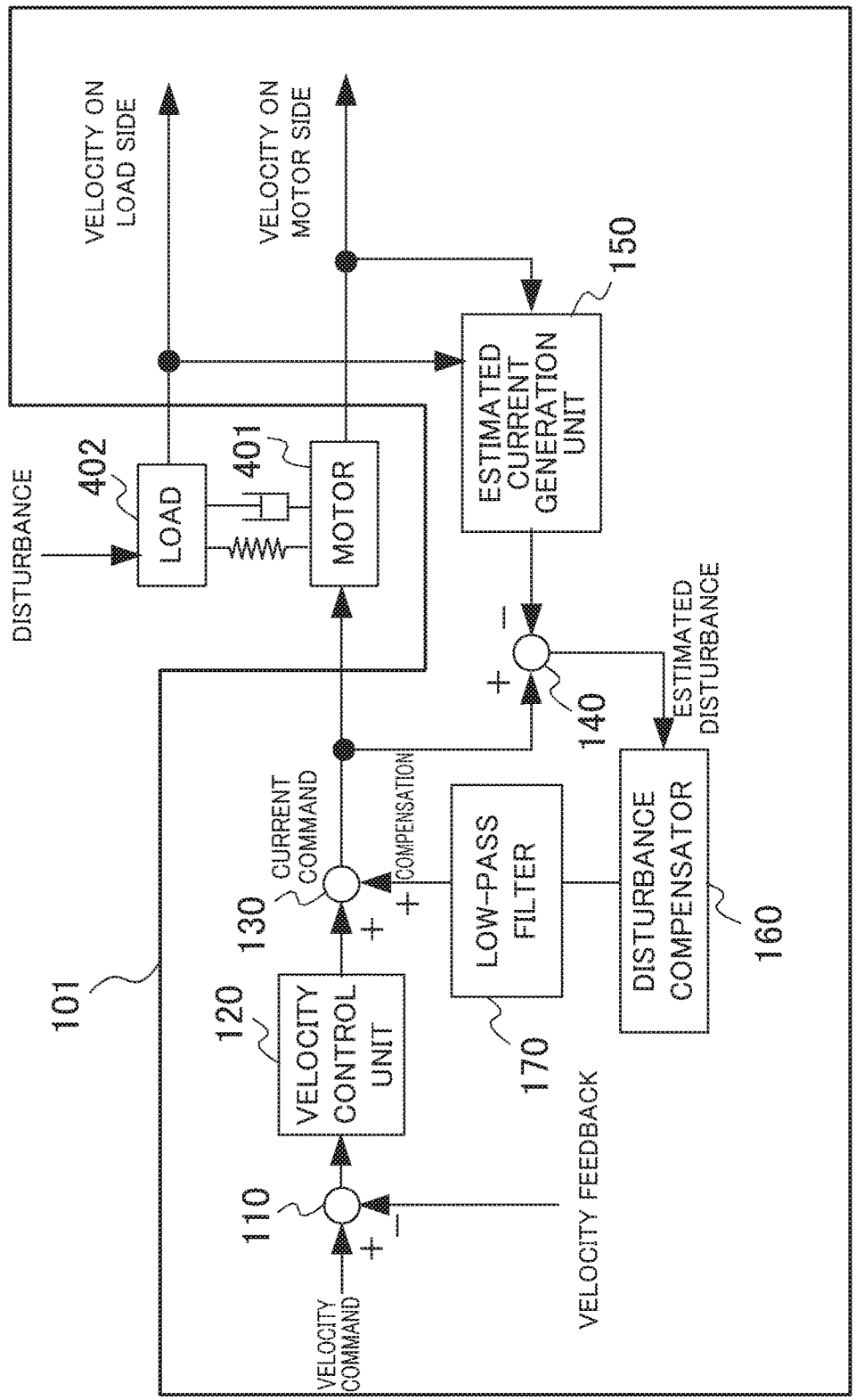
FIG. 7 is a block diagram showing the configuration of the servo control device during machining in the servo control system according to the second embodiment of the present invention.
Figure 8:
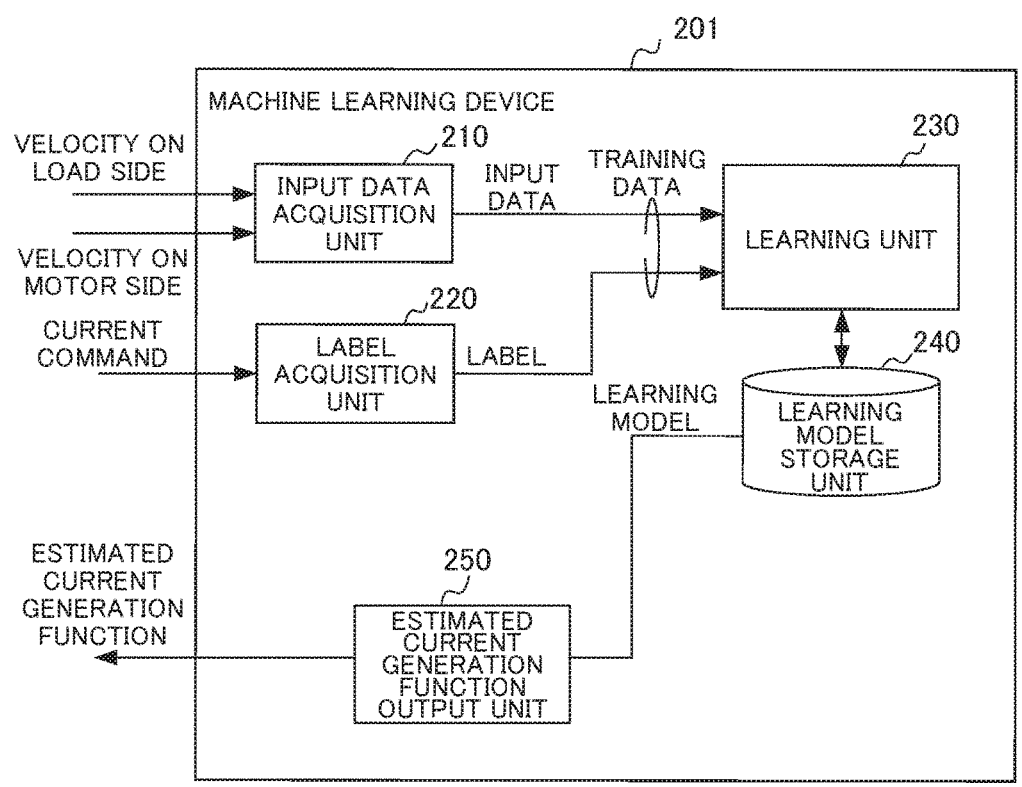
FIG. 8 is a block diagram showing the configuration of the machine learning device in the servo control system according to the second embodiment of the present invention.

As shown in FIG. 6 and FIG. 7, the differences between the servo control system of the present embodiment and the servo control system of the first embodiment shown in FIGS. 2 and 3 are in the points of the control target being configured by a servomotor 401 and load 402, and the velocity detection value outputted from the rotary encoder of the servomotor 401 and the velocity detection value on the load side outputted from the linear scale detecting the velocity of the load 402 being inputted to the estimated current generation unit 150 and machine learning device 201.

The differences between the machine learning device 201 and machine learning device 200 are in the points of both the velocity detection value on the load side and the velocity detection value on the servomotor 401 side being inputted as input data to the input data acquisition unit 210, and the learning unit 230 constructing a learning model by performing machine learning called supervised learning, based on training data which establishes these two velocity detection values as input data, and establishes the current command value as the label.

The load 402 connected to the servomotor 401, in the case of being a machine tool, for example, corresponds to the table on which placing the workpiece to be machined. The servomotor 401 and table are connected by way of a connection mechanism, and the connection mechanism is illustrated by a damper and spring as a mechanical equivalent circuit, as shown in FIGS. 6 and 7. The connection mechanism includes a coupling that is connected to the servomotor 401, a ball screw fixed to the coupling, and a nut that is threaded to the ball screw and is joined to the table. The rotational motion of the servomotor 401 is converted into linear motion of the table by such a connection function. The velocity of the load 402 can be measured by mounting a linear scale to the end of the ball screw 3033.

Also in the second embodiment, control for compensating disturbance is not performed during machine learning, similarly to the first embodiment. For this reason, in FIG. 6, the circuit leading to the adder 130 via the subtracter 140, estimated current generation unit 150, disturbance compensator 160 and low-pass filter 170 does not function. With the meaning of the circuit not functioning, this circuit is expressed by a dotted line in FIG. 6. To configure so as not to allow this circuit to function, it is sufficient so long as the servo control device 101 controls so that the output signal is not outputted from the disturbance compensator 160, for example. On the other hand, during actual machining, machine learning is not performed, and thus the connection with the machine learning device 201 is not illustrated in FIG. 7 for this reason.

Not limited to the case of disturbance occurring due to machining a workpiece, and the rotation velocity of the servomotor 401 having changed, the servo control system of the second embodiment can compensate the current command value so as to suppress this velocity change also in the case of the velocity of the load 402 having changed due to disturbance.

Third Embodiment

Next, an explanation will be made for the configuration of a third embodiment by referencing FIGS. 9, 10 and 11. It should be noted that, for the functions and configurations of the third embodiment, explanations will be omitted for the functions and configurations shared with the aforementioned first embodiment. In addition, in FIGS. 9 to 11, the same reference symbols are attached and redundant explanations will be omitted, and an explanation will be made in detail for points differing between the first embodiment and third embodiment.

Figure 9:
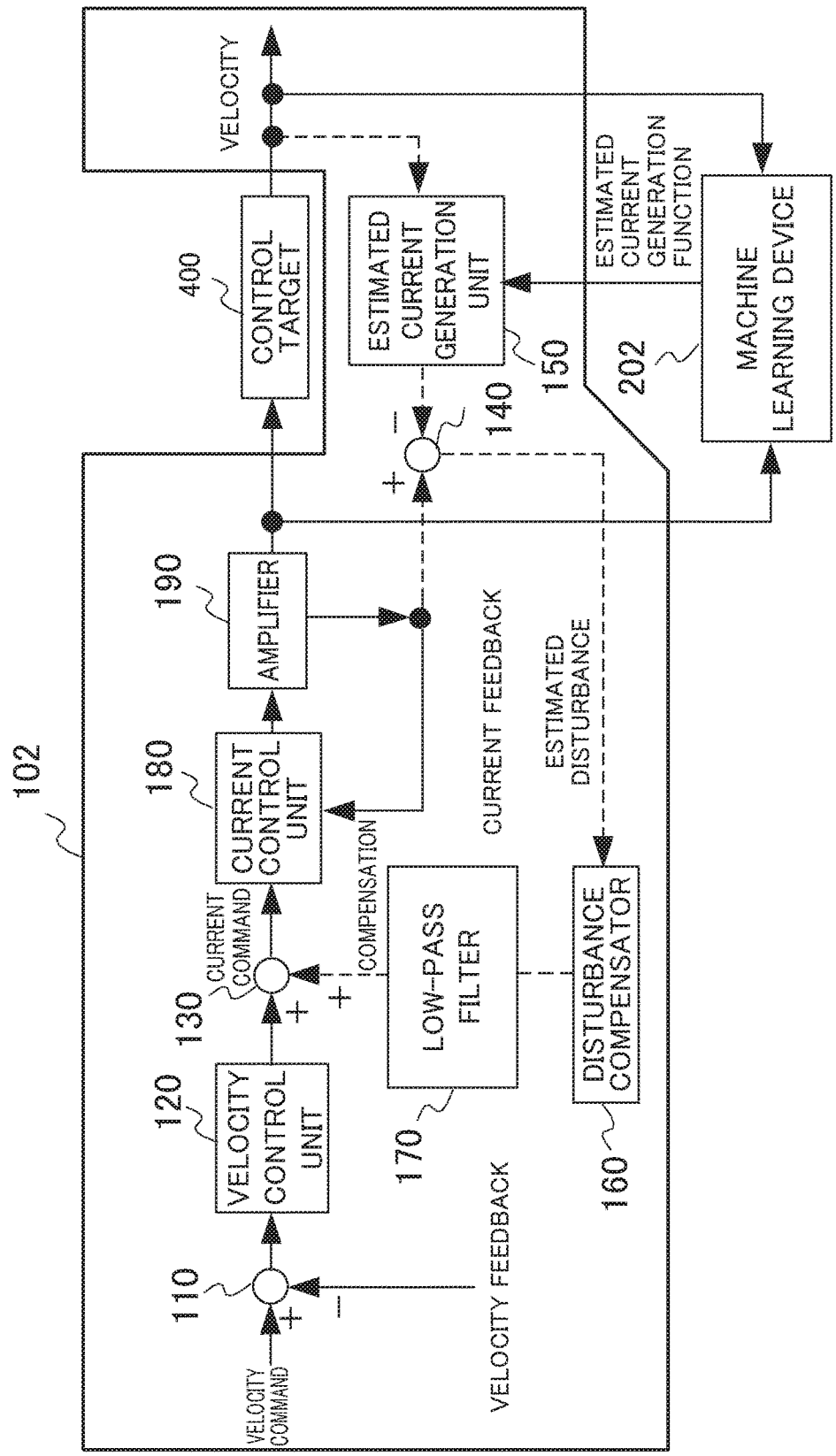
FIG. 9 is a block diagram showing one configuration example of a servo control device and a machine learning device in a servo control system according to a third embodiment of the present invention.

FIG. 9 is a block diagram showing one configuration example of the servo control device and machine learning device in the servo control system according to the third embodiment of the present invention. FIG. 10 is a block diagram showing the configuration of the servo control device during machining in the servo control system according to the third embodiment of the present invention. FIG. 11 is a block diagram showing the configuration of the machine learning device in the servo control system according to the third embodiment of the present invention.

Figure 10:
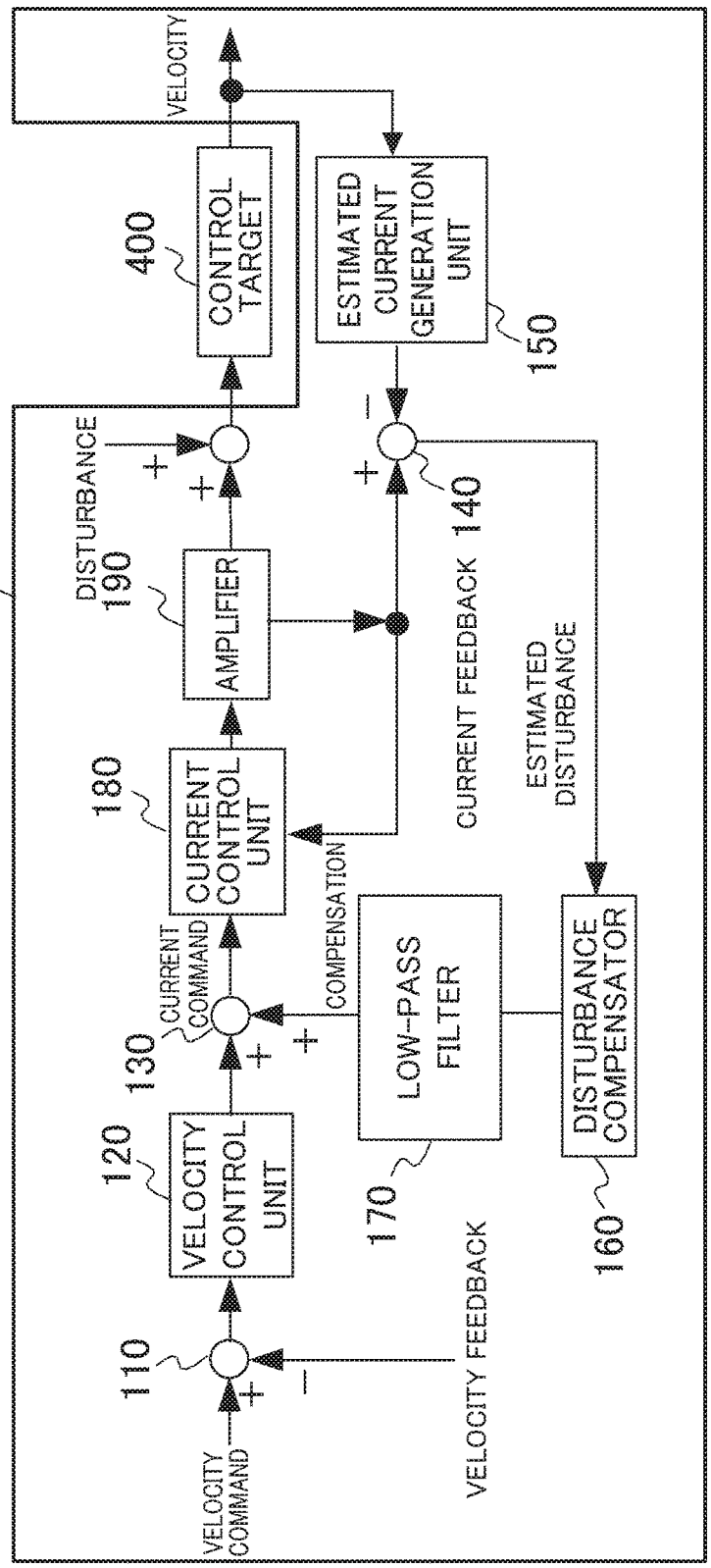
FIG. 10 is a block diagram showing the configuration of the servo control device during machining in the servo control system according to the third embodiment of the present invention.

As shown in FIG. 9 and FIG. 10, the differences between the servo control system of the present embodiment and the servo control system of the first embodiment shown in FIG. 2 and FIG. 3 are in the points of a current control unit 180 and amplifier 190 being added to the output side of the adder 130, and a current feedback loop being formed. A voltage command is sent to the amplifier 190 from the current control unit 180, and the current controlled by the amplifier 190 is supplied to the control target 400. In addition, the current supplied to the control target 400 is fed back to the current control unit 180, as well as being supplied to the subtracter 140 and machine learning device 202. The current control unit 180 outputs the difference between the current command and current feedback to the amplifier 190.

Figure 11:
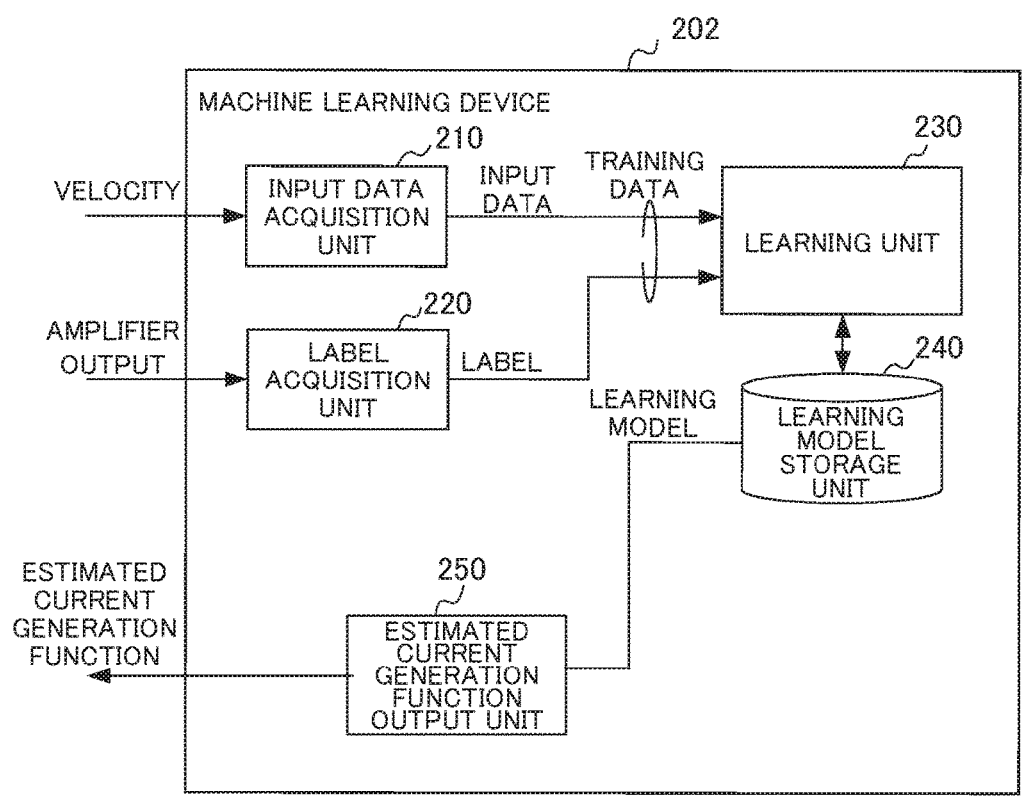
FIG. 11 is a block diagram showing the configuration of the machine learning device of the servo control system according to the third embodiment of the present invention.

The differences between the machine learning device 202 and machine learning device 200, as shown in FIG. 11, are in the points of the output of the amplifier 190 being inputted to the label acquisition unit 220, and the learning unit 230 constructing a learning model by way of performing machine learning called supervised learning establishing the output of the amplifier 190 as the label.

An explanation has been made above for three embodiments of the present invention. The aforementioned respective embodiments are preferred embodiments of the present invention; however, it is not to limit the scope of the present invention to only the aforementioned respective embodiments, and realization in modes achieved by conducting various modifications in a scope not departing from the gist of the present invention is possible. For example, realization in modes achieved by conducting modifications such as described below is possible.

<Modified Example in which Servo Control Device Includes Machine Learning Device>

In the aforementioned embodiments, the machine learning devices 200 to 202 are configured by separate devices from the servo control devices 100 to 102; however, it may be configured so as to realize a part or the entirety of the functions of the machine learning devices 200 to 202 by way of the servo control devices 100 to 102.

<Degrees of Freedom in System Configuration>

In the aforementioned embodiments, the servo control devices 100 to 102 and machine learning devices 200 to 202 are connected to be communicable as 1-to-1 groups; however, the configurations of the respective embodiments are not limited to such a configuration. For example, when explaining with the example of the servo control device 100 and machine learning device 200, it may be configured so that one machine learning device 200 and a plurality of servo control devices 100 are connected to be communicable either directly or via a network, whereby machine learning of the respective servo control devices 100 is realized. At this time, the respective functions of the machine learning device 200 may be established as a decentralized processing system which distributes to a plurality of servers as appropriate. In addition, the respective functions of the machine learning device 200 may be realized using a virtual server function, etc. on a cloud.

In addition, in the case of there being a plurality of control targets 400 each corresponding to a plurality of servo control devices 100 of a plurality of the same model name, same specification, or same series, the servo control system may be configured so as to share learning results of the respective servo control devices 100. By configuring in this way, the servo control system becomes able to construct a more optimized model.

<On-Line Learning, Batch Learning and Mini-Batch Learning>

The supervised learning of the aforementioned learning unit 230 may perform on-line learning, may perform batch learning, or may perform mini-batch learning. On-line learning is a learning method of performing supervised learning immediately every time the control target 400 is driven, and training data is created. In addition, batch learning is a learning method of, while the control target 400 is driven and training data is repeatedly created, collecting a plurality of sets of training data in response to the repetition, and performing supervised learning using all of the collected training data. Furthermore, mini-batch learning is a learning method between on-line learning and batch learning of performing supervised learning each time a certain amount of training data accumulates.

In addition, the respective embodiments explained above can be realized by way of hardware, software or a combination thereof. Herein, being realized by software indicates the matter of being realized by a computer reading out and executing programs. In the case of configuring by hardware, a part or the entirety of the respective embodiments, for example, can be configured by integrated circuits (IC) such as LSI (Large Scale Integrated circuit), ASIC (Application Specific Integrated Circuit), gate array, or FPGA (Field Programmable Gate Array).

In addition, in the case of a part or the entirety of the respective embodiments being configured by a combination of software and hardware, the CPU of a computer stores the information required in computing in the DRAM, and runs the programs encoding the entirety or part of the operations of the servo control device shown in the flowchart. The computer is configured by storage units such as a hard disk and ROM storing these programs, DRAM which stores the data required in computation, a CPU, and a bus connecting the respective parts.

The programs can be stored using various types of computer readable recording media, and supplied to the computer. The computer readable recording media includes various types of tangible storage media. The computer readable recording media include magnetic media (for example, flexible disks, magnetic tape, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, and RAM (random access memory)).

EXPLANATION OF REFERENCE NUMERALS 10 servo control system
100, 100-1~100-n servo control device 110 subtracter
120 velocity control unit
130 adder
140 subtracter
150 estimated current generation unit
160 disturbance compensator
170 low-pass filter
200, 200-1~200-n machine learning device
210 input data acquisition unit
220 label acquisition unit
230 learning unit
240 learning model storage unit
250 estimated current generation function output unit
300 network
400 control target

What is claimed is:

1. A servo control system comprising:
a machine learning device including:
   a label acquisition unit for acquiring, as a label, a current command that drives a control target of a servo control device in a state in which disturbance is suppressed,
   an input data acquisition unit for acquiring, as input data, a velocity of the control target driven based on the current command in the state in which disturbance is suppressed,
   a learning unit for constructing a learning model for estimating a current to drive the control target from the velocity of the control target, by way of performing supervised learning with a group of the label and the input data as training data, and
   a function output unit for generating a function for estimating a current to drive the control target from the velocity of the control target, based on the learning model constructed by the learning unit, and for outputting the function to the servo control device; and
the servo control device for outputting the current command and the velocity of the control target to the machine learning device,
wherein the servo control device includes: an estimated current generation unit for estimating a current to drive the control target from the velocity of the control target, based on the function outputted from the function output unit a subtraction unit for obtaining a difference between the current command and an estimated current that was estimated by the estimated current generation unit and a disturbance compensating unit for generating a compensated current for compensating disturbance based on the difference,
wherein the servo control device includes a current control unit that constitutes a current feedback loop, and an amplifier, wherein the current command to drive the control target is applied to the control target via the current control unit and the amplifier, and
wherein output of the amplifier is the current command acquired by the label acquisition unit.

2. A servo control system comprising:
a machine learning device including:
   a label acquisition unit for acquiring, as a label, a current command that drives a control target of a servo control device in a state in which disturbance is suppressed,
   an input data acquisition unit for acquiring, as input data, a velocity of the control target driven based on the current command in the state in which disturbance is suppressed,
   a learning unit for constructing a learning model for estimating a current to drive the control target from the velocity of the control target, by way of performing supervised learning with a group of the label and the input data as training data, and
   a function output unit for generating a function for estimating a current to drive the control target from the velocity of the control target, based on the learning model constructed by the learning unit, and for outputting the function to the servo control device; and
the servo control device for outputting the current command and the velocity of the control target to the machine learning device,
wherein the servo control device includes: an estimated current generation unit for estimating a current to drive the control target from the velocity of the control target, based on the function outputted from the function output unit a subtraction unit for obtaining a difference between the current command and an estimated current that was estimated by the estimated current generation unit and a disturbance compensating unit for generating a compensated current for compensating disturbance based on the difference,
wherein the control target includes a motor and a load that moves by way of the motor, and
wherein the velocity acquired by the input data acquisition unit is a rotation velocity of the motor and a velocity of the load.

3. A servo control device comprising:
a machine learning device including:
   a label acquisition unit for acquiring, as a label, a current command that drives a control target of a servo control device in a state in which disturbance is suppressed,
   an input data acquisition unit for acquiring, as input data, a velocity of the control target driven based on the current command in the state in which disturbance is suppressed,
   a learning unit for constructing a learning model for estimating a current to drive the control target from the velocity of the control target, by way of performing supervised learning with a group of the label and the input data as training data, and
   a function output unit for generating a function for estimating a current to drive the control target from the velocity of the control target, based on the learning model constructed by the learning unit, and for outputting the function;
an estimated current generation unit for estimating the current to drive the control target from the velocity of the control target, based on the function outputted from the function output unit;
a subtraction unit for obtaining a difference between the current command and the estimated current that was estimated by the estimated current generation unit;
a disturbance compensating unit for generating a compensated current for compensating disturbance based on the difference; and
a current control unit that constitutes a current feedback loop, and an amplifier,
wherein the current command to drive the control target is applied to the control target via the current control unit and the amplifier, and
wherein output of the amplifier is the current command acquired by the label acquisition unit.

4. A servo control device comprising:
a machine learning device including:
- a label acquisition unit for acquiring, as a label, a current command that drives a control target of a servo control device in a state in which disturbance is suppressed,
- an input data acquisition unit for acquiring, as input data, a velocity of the control target driven based on the current command in the state in which disturbance is suppressed,
- a learning unit for constructing a learning model for estimating a current to drive the control target from the velocity of the control target, by way of performing supervised learning with a group of the label and the input data as training data, and
- a function output unit for generating a function for estimating a current to drive the control target from the velocity of the control target, based on the learning model constructed by the learning unit, and for outputting the function;

an estimated current generation unit for estimating the current to drive the control target from the velocity of the control target, based on the function outputted from the function output unit;
a subtraction unit for obtaining a difference between the current command and the estimated current that was estimated by the estimated current generation unit; and
a disturbance compensating unit for generating a compensated current for compensating disturbance based on the difference;
wherein the control target includes a motor and a load that moves by way of the motor, and
wherein the velocity acquired by the input data acquisition unit is a rotation velocity of the motor and a velocity of the load.

5. A servo control method, comprising:
via a machine learning device:
acquiring, as a label, a current command to drive a control target of a servo control device in a state in which disturbance is suppressed;
acquiring, as input data, a velocity of the control target driven based on the current command in the state in which disturbance is suppressed;
constructing a learning model for estimating the current to drive the control target from the velocity of the control target, by way of performing supervised learning with a group of the label and the input data as training data; and
generating a function for estimating a current to drive the control target from the velocity of the control target, based on the learning model, and
via a servo control device:
estimating a current to drive the control target from the velocity of the control target, based on the function generated;
obtaining a difference between the current command and the current estimated; and
generating a compensated current for compensating disturbance based on the difference; and
applying the current command to the control target via a current control unit and an amplifier,
wherein output of the amplifier is the current command that is acquired in said acquiring.

6. A servo control method, comprising:
via a machine learning device:
acquiring, as a label, a current command to drive a control target of a servo control device in a state in which disturbance is suppressed;
acquiring, as input data, a velocity of the control target driven based on the current command in the state in which disturbance is suppressed;
constructing a learning model for estimating the current to drive the control target from the velocity of the control target, by way of performing supervised learning with a group of the label and the input data as training data; and
generating a function for estimating a current to drive the control target from the velocity of the control target, based on the learning model, and
via a servo control device:
estimating a current to drive the control target from the velocity of the control target, based on the function generated;
obtaining a difference between the current command and the current estimated; and
generating a compensated current for compensating disturbance based on the difference;
wherein the control target includes a motor and a load that moves by way of the motor, and
wherein the velocity acquired by the input data acquisition unit is a rotation velocity of the motor and a velocity of the load.

* * * * *